United States Patent
Drazin

(10) Patent No.: US 10,600,412 B2
(45) Date of Patent: Mar. 24, 2020

(54) COMMUNICATION SYSTEM

(71) Applicant: Simple Matters Limited, Berkshire (GB)

(72) Inventor: Jonathan Peter Vincent Drazin, Berkshire (GB)

(73) Assignee: Simple Matters Limited, Berkshire (GB)

( * ) Notice: Subject to any disclaimer, the term of this patent is extended or adjusted under 35 U.S.C. 154(b) by 0 days.

(21) Appl. No.: 15/770,686

(22) PCT Filed: Oct. 27, 2016

(86) PCT No.: PCT/GB2016/053337
§ 371 (c)(1),
(2) Date: Apr. 24, 2018

(87) PCT Pub. No.: WO2017/072510
PCT Pub. Date: May 4, 2017

(65) Prior Publication Data
US 2019/0057689 A1   Feb. 21, 2019

(30) Foreign Application Priority Data

Oct. 28, 2015 (GB) .................................. 1519032.5

(51) Int. Cl.
*G10L 15/00* (2013.01)
*G10L 15/18* (2013.01)
(Continued)

(52) U.S. Cl.
CPC .......... *G10L 15/22* (2013.01); *G06K 7/10297* (2013.01); *G06K 7/1413* (2013.01);
(Continued)

(58) Field of Classification Search
None
See application file for complete search history.

(56) References Cited

U.S. PATENT DOCUMENTS 8,620,658 B2 * 12/2013 Nakade .................. G10L 15/30
704/10
10,102,856 B2 * 10/2018 Segal ...................... G10L 15/22
(Continued)

FOREIGN PATENT DOCUMENTS

WO    WO 2013/175236 A2    11/2013
WO    WO 2016/012751 A1    1/2016

OTHER PUBLICATIONS

International Searching Authority, International Search Report and Written Opinion for International Application No. PCT/GB2016/053337, dated Dec. 9, 2016, 10 pages, European Patent Office, Netherlands.

(Continued)

*Primary Examiner* — Satwant K Singh
(74) *Attorney, Agent, or Firm* — Alston & Bird LLP

(57) ABSTRACT

A system and means for recognising phrases of approval, questions and answers in speech conversations exchanged between communication devices such that the phrase recognition means is conditional upon detection of a non-speech event from the devices to denote a subject of interest, the phrase recognition means employing detection of non-speech events from the devices to identify and select speech recognition rules of relevance to the subject item, questions about the subject and answers to the questions. Speech recognition means logs detected speech and non-speech events to a repository for later analysis.

20 Claims, 18 Drawing Sheets

(51) Int. Cl.
*G10L 15/22* (2006.01)
*G06Q 30/02* (2012.01)
*G06K 7/10* (2006.01)
*G06K 7/14* (2006.01)
*G10L 15/19* (2013.01)

(52) U.S. Cl.
CPC ...... *G06Q 30/0201* (2013.01); *G10L 15/1815* (2013.01); *G10L 15/19* (2013.01)

(56) References Cited

U.S. PATENT DOCUMENTS

| | | | |
|---|---|---|---|
| 10,210,866 B2* | 2/2019 | Segal | G10L 15/22 |
| 2006/0253524 A1 | 11/2006 | Foreman et al. | |
| 2008/0119134 A1* | 5/2008 | Rao | G06Q 30/02 |
| | | | 455/3.05 |
| 2011/0182283 A1 | 7/2011 | Van Buren et al. | |
| 2017/0208022 A1* | 7/2017 | Drazin | H04L 51/046 |
| 2018/0226067 A1* | 8/2018 | Dhoolia | G10L 15/01 |

OTHER PUBLICATIONS

The International Bureau of WIPO, International Preliminary Report on Patentability for International Application No. PCT/GB2016/053337, dated May 1, 2018, 9 pages, Switzerland.

* cited by examiner

| event_id | timedate | event_type | dev_id | arguments |
|---|---|---|---|---|
| 1 | 22/04/2015 17:21:19 | subject | 123 | item=RedShoes123 |
| 2 | 23/04/2015 17:22:04 | text | 456 | degree=5 |
| 3 | 23/04/2015 17:32:05 | question | 123 | question=222 |
| 4 | 23/04/2015 17:32:16 | answer | 456 | answer=333 |
| 5 | 23/04/2015 17:33:02 | text | 456 | degree=-2 |
| 6 | 23/04/2015 17:33:08 | answer | 789 | answer=335 |
| 7 | 23/04/2015 17:33:23 | subject | 456 | item=GreenShoes456 |

404 — event_id
405 — timedate
406 — event_type
407 — dev_id
408 — arguments
308

Fig. 4B

| rule | rule_name | state | subject_item | event_type | transition |
|---|---|---|---|---|---|
| 1 | Don't like | 1001 | Red Shoes 123 | approval | null |
| 2 | Like | 1001 | Red Shoes 123 | approval | null |
| 3 | Does it suit me | 1001 | Red Shoes 123 | question | 1002 |
| 4 | Is it too expensive | 1001 | Red Shoes 123 | question | 1003 |
| 5 | Suits you | 1002 | Red Shoes 123 | answer | null |
| 6 | Not your colour | 1002 | Red Shoes 123 | answer | null |
| 7 | Good value | 1003 | Red Shoes 123 | answer | null |
| 8 | Too expensive | 1003 | Red Shoes 123 | answer | null |

Fig. 8

COMMUNICATION SYSTEM

CROSS REFERENCE TO RELATED APPLICATIONS

This application is a National Stage Application, filed under 35 U.S.C. 371, of International Application No. PCT/GB2016/053337, filed Oct. 27, 2016, which International Application claims priority to and the benefit of United Kingdom Application No. 1519032.5, filed Oct. 28, 2015; the contents of both of which as are hereby incorporated by reference herein in their entirety.

BACKGROUND

Related Field

The invention relates to a system for gathering data from telephone users, the fields of interactive message and speech communication over the Internet, the fields of computer data and database processing, the fields of speech and semantic recognition, the fields of mobile and tablet device input from and display to users, and other fields of electronic communications.

Description of Related Art

Consumer market research uses a range of methods to survey the opinions of target consumers. These involve typically design of a questionnaire by formulating questions, formulating and scaling possible answers to the questions, designing and procuring a sample of respondents representative of the targeted consumers (e.g. using attributes such as age, gender, economic status), collecting response data from the respondents and analysing the data. Accuracy of responses is compromised where respondents are aware of an entity commissioning the research or where questions are personal (sensitivity bias).

Today, data collection via face-face and questionnaire hardcopy administered surveys is largely replaced with soliciting respondents via e-mail to complete questionnaires on-line. Response rates to e-mail requests are poor because of the frequency with which prospective respondents are bombarded with requests and the time questionnaires take to complete. Respondents may poorly match a survey's target sample as a result. To improve response rate, requests may contain offers of rewards for completed questionnaires, but which introduces further bias. Survey respondents frequently become impatient to complete questionnaires and answer randomly, resulting in inaccuracies. Survey design, administration and analysis are expensive so that, typically, surveys run for an ad hoc limited period only.

To overcome these problems researchers have turned in recent years to alternative sources of consumer opinion by analysing posts to social media sites such as Facebook, Pinterest and Twitter. Benefits are low cost, issues are many and easy to identify and large post volumes make trends easier to spot. However, social media suffers from sensitivity bias because posters do not know and trust their audiences at personal levels. Posts tend to focus on media worthy extreme post-purchase experiences as opposed to common pre-purchase issues. Posters' individual socio-demographic profiles are frequently unknown. A major limitation is that posts rarely cite sufficient information, such as stock keeping unit (SKU) or model name, to identify items reliably or identify the retailers or branches from where the posted items were or may be purchased.

Many shoppers engage with trusted close friends in spoken conversations about items they might buy using smartphones, where the issues and opinions raised during these conversations are frank, and hence reliable. Automated means would be useful for research purposes whereby these issues and opinions can be recognised and attributed to items by measuring their frequencies of occurrence. The invention solves several problems to achieve these automated means, as described below.

To obtain acceptable recognition accuracy, the vocabulary of a conversation must be adjusted and minimised according to its subject to include only words that are likely to be spoken. However, in the case of a conversation about shopping items and other physical objects and services, it is difficult to determine the type of the item that is the subject of the conversation because consumers seldom articulate subjects sufficiently in spoken conversation or chat so that it is often impossible to resolve a subject item's exact identity (e.g. SKU code). Means to recognise spoken issues and opinions are required that have acceptably low battery drain and bandwidth consumption. However, speech recognition processing of continuous conversations is infeasible in smartphones because it consumes high power and depletes battery life. Embedding specialist devices or low level software in smartphones reduces device power consumption but requires device dependent re-configuration to change vocabularies and are frequently inaccessible to app developers. Conversely, routing continuous conversations to a remote server on the Internet operated by a researcher for recognition overcomes battery power consumption problems but incurs high bandwidth costs for the researcher. A further problem is that, while smartphone users are frequently familiar with posting items into chat apps, such steps are inconvenient when discussing items in a call because smartphone screens do not normally have sufficient area to display simultaneously item content and a chat conversation, so that means are required to detect a subject item implicitly without requiring a caller to post the item into the conversation.

The invention is a system where the issues, opinions and sentiments exchanged between mobile device callers and other mobile device callers are recognised, which could be used in a variety of applications that rely on a man-machine or user-device interface, such as but not limited to market research purposes.

BRIEF SUMMARY

At least one aspect of the present invention is defined by the independent claims appended herewith. At least one preferred feature is defined by the dependent claims.

According to the present invention, there is provided a communication system. The system comprises or is configured to communicate with a device that is adapted to enable and exchange conversations comprising non-speech components with at least one other device. The system may be configured to resolve an identity of a subject item of the conversation as content denoting a product and/or a service (where hereafter references to "item" and "subject" are synonymous with "product" and/or "service"). The system may be configured to communicate the identity of the item, e.g. to the other components of the system.

The non-speech components may comprise selection of an item to be a subject of conversation, predetermined questions about the subject, predetermined answers to the questions, text messages and ratings. On occurrence of a non-speech component the communication device may generate data to describe the component, the time of the occurrence and may log the data as an event to a server.

The device and/or the at least one other device may be, comprise or be comprised in a communication device. The communication device may be configured to exchange conversations comprising telephone calls and/or non-speech components with the at least one other communication device.

The communication device may be configured to present content responsive to selection of an item by a user. Events may denote an action, approval, disapproval or other sentiment performed, input or spoken to the device by a user of the device. Events may comprise the identity of a subject, e.g. by resolving an item identifier of the selected item presented by the communication device and the at least one other communication device. Alternatively, the identity of the subject may be resolved by recognising the item's identifier from a barcode, still or moving image taken with a camera or uploading an identifier of the item from a wireless tag in proximity.

The system may comprise, be comprised in or configured to communicate with a server. The server may be communicatively connected to the communication devices and may be configured to select a set of rules, such as grammar or language rules, that corresponds to the subject. The server may be configured to detect and store digital data corresponding to the speech components detected by the telephone devices. The server may be configured to recognise an event within the digital data at least partially using or based on the rules.

The device may be adapted to present to a user one or a plurality of user selectable questions relating to the item; receive a signal indicative of user selection of one of the user selectable questions and send the selected question to the at least one other device.

The at least one other device may be adapted to store the user selectable questions for presenting to a user in response to a user request. The at least one other device may be adapted to present a user selectable cell that when selected causes the selected question to be presented in conjunction with the item to the user.

The at least one other device may be adapted to present one or a plurality of user selectable answers to the question; receive a signal indicative of user selection of one of the answers and send the identity of the selected answer to the device.

The device may be adapted to present the selected answer in conjunction with the item.

In response to the indicative signal, the device and/or the at least one other device may send a request to a remote device, such as the server, for information to generate the user selectable questions and/or answers. On receipt of the information, the device may be adapted to store the information for later use to present the user selectable questions and/or answers to the user. Alternatively, the device may be adapted to use the information to present the user selectable questions to the user.

The system may comprise a communication hub. The system may activate the hub conditionally upon the identity of an item selected in a non-speech conversation. Upon activation the hub may connect the devices telephonically and may route the telephone calls to the server.

The system may be, comprise or be comprised in a speech recognition unit and the conversation may comprise a speech component. The server may comprise a speech recognition unit that recognises a speech component from one or a plurality of rules. The speech components may comprise predetermined questions that relate to the subject, predetermined answers to the questions, or phrases denoting approval or disapproval of the subject. The server may scale the degree of approval or disapproval of a speech component.

The speech recognition unit may recognise a speech component from a predetermined set of the rules. The speech recognition unit may substitute the set for another set conditionally upon the subject item's identity.

The server may generate an event, e.g. a speech event, responsive to recognition of a speech component and store the speech event with the non-speech events for later analysis.

The communication device may lead by sending the subject corresponding to the selected item to the at least one other communication device. Responsive to receipt of the subject, the at least one other communication device may follow by presenting the corresponding content, which may be presented sufficiently in real time to allow an intelligible speech conversation about the subject.

The following device may be adapted to detect a user selection indicative of a request to lead and send the lead request indication to the leading device. The leading device may be adapted to present the lead request, detect user selection of an acceptance of the request and send the acceptance to the following device. The leading and following devices may be adapted to swap the leading and following roles on receipt of the acceptance.

According to an aspect of the present invention is a server, e.g. for use with the system of the preceding aspect. The server may be communicatively connected to the communication devices and may be configured to select a set of rules, such as grammar or language rules, that corresponds to the subject. The server may be configured to detect and store digital data corresponding to the speech components detected by the telephone devices. The server may be configured to recognise an event within the digital data at least partially using or based on the rules. The server may be configured to log events generated by the devices, e.g. data to describe the component, the time of the occurrence generated by the communication device on occurrence of a non-speech component.

The server may comprise any feature of a server described in relation to any preceding aspect.

According to a third aspect of the invention is a method of using a communication system comprising a communication device, such as a telephone device. The method may comprise exchanging speech and non-speech components of a conversation, e.g. with at least one other communication device. The method may comprise resolving an item as the subject of the conversation, e.g. using the communication device and/or the at least one other communication device. The method may comprise displaying the item and/or an identifier of the item. The method may comprise selecting a set comprising rules, such as grammar, vocabulary, language and/or phonetic rules, that corresponds to the subject. The method may comprise detecting and storing digital data corresponding to the speech components detected by each of the communication devices. The method may comprise detecting events indicative of the non-speech components. The method may comprise recognising an event within the digital data at least partially using or based on the set.

The method may comprise using, implementing or operating the system of the first aspect.

According to a fourth aspect of the invention is a computer program product that, when on a processing device, such as a communication device or server, causes the processing device to implement the method of the third aspect.

The features defined above in accordance with any aspect of the present invention or below in relation to any specific embodiment of the invention may be utilised, either alone or in combination with any other defined feature, in any other aspect or embodiment of the invention. Furthermore, the present invention is intended to cover apparatus configured to perform any feature described herein in relation to a method and/or a method of using or producing or manufacturing any apparatus feature described herein.

BRIEF DESCRIPTION OF THE FIGURES

Various embodiments of the invention will now be described by way of example only and with reference to the accompanying drawings, where:

FIG. 4B is a table of exemplary events;

DETAILED DESCRIPTION OF VARIOUS EMBODIMENTS

Figure 1:
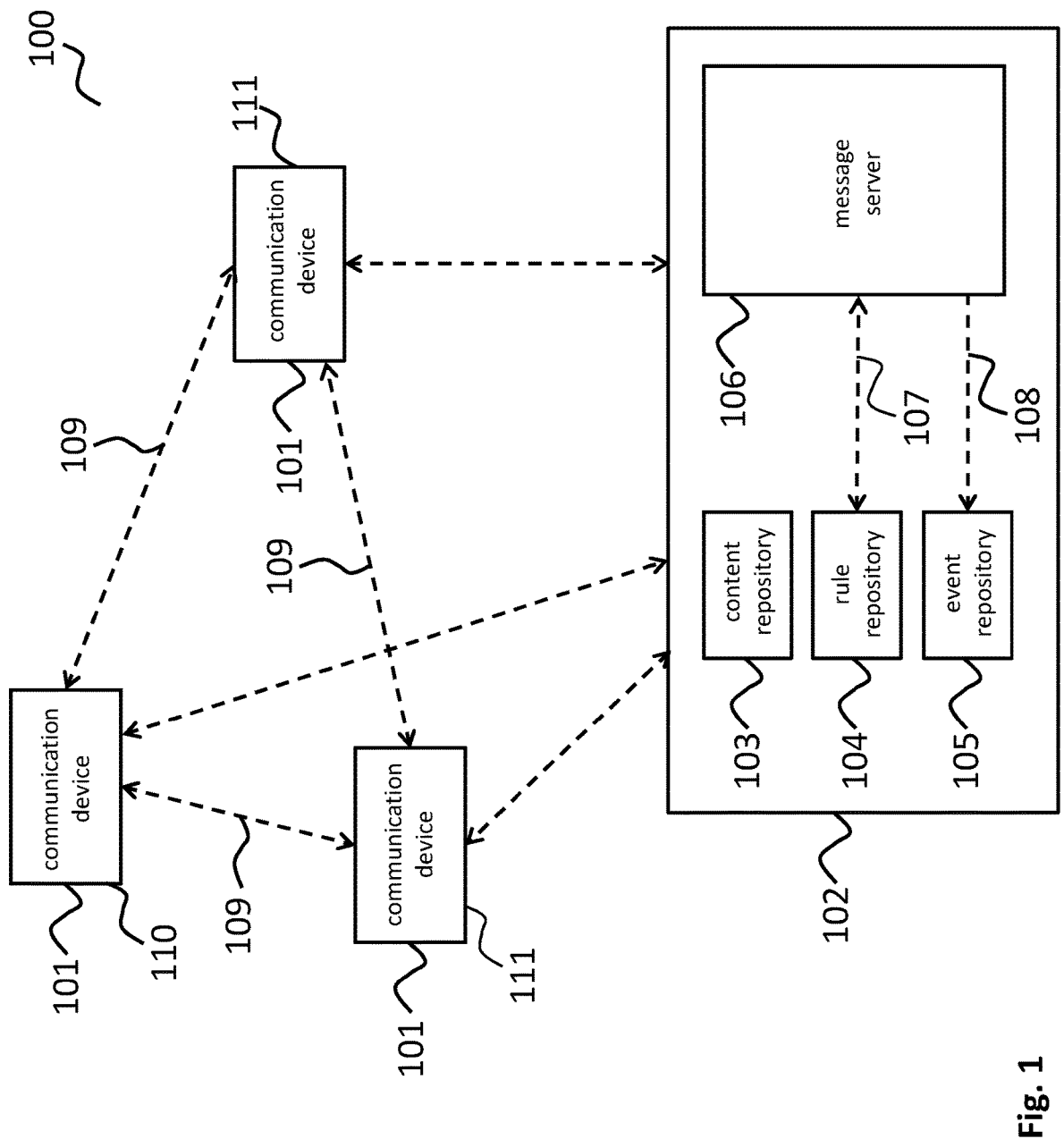
FIG. 1 is a diagram of a chat system comprising communication devices that are each members of a conversation about a subject item.

FIG. 1 shows a chat system 100 comprising a plurality of communication devices 101 each bi-directionally connected communicatively across the Internet (dotted lines) to the other communication devices. Each of the devices is a member of, and subscribes to, a common chat conversation. Chat system 100 is taught further in WO2016012751 where contents of which are incorporated herein by reference. Member devices 101 comprise a telephone function capable of speech calls with other devices 101 over the Internet, are battery powered, and preferably portable such as a smartphone, but may be any computing device capable of display of information to its user and capable of receipt of commands, text, selections, speech and touch inputs from the user. The device may comprise an optical head mounted display device such as Google Glass. As is common in almost all smartphones and Google Glass, device 101 may comprise a camera sensor capable of imaging an item or a barcode, VR Code or image that maps to an identifier of the item. Device 101 may comprise a short range (<25 meters) wireless sensor, such as an NFC (near field communication) or Bluetooth transceiver capable of detecting the presence of an RFID (radio frequency identification) or beacon tag and uploading an identifier of the item from the tag. Device 101 may be distributed across multiple co-located physical components coupled by wireless communication such as an exemplary Google Glass component coupled to an Android smartphone component, or an exemplary iPhone component coupled to an Apple Watch component. As is commonly known to persons skilled in the art, device 101 may employ an operating system such as Android or iOS and is capable of executing software applications installed under the device user's control over the Internet from an app store, which are linked to software development libraries comprising functionalities of the processes of this invention including structured query language (SQL), MQ Telemetry Transport (MQTT), web (HTTP) and web real-time communication (WebRTC) clients. The application programming interface (API) and programming environments employed by the applications are widely available, where the applications read and write programmatically to and from volatile and non-volatile hardware memory locations built into the device and where these applications are coupled to and receive device user inputs from either hard key or touch sensitive screen keyboards, are capable of converting audio signals to data received from a built-in microphone, are capable of converting data to audio signals emitted from a built-in earphone or loudspeaker, are capable of detecting and processing the device's spatial location and orientation over time through reading data from sensors, and where these applications write graphical and text images to a built-in screen for display purposes.

Devices 101 are bi-directionally connected communicatively across the Internet to a data server 102 which may comprise one or a plurality of hardware server units to perform the functions described. Data server 102 comprises a web site content repository 103 (e.g. www.amazon.com) that serves content relating to one or a plurality of items to devices 101, a repository of phrases denoting approval, questions and answers relating to items and rules to assist their recognition in conversations ("rule repository") 104, an event repository 105 for storing information describing device 101 actions and a server 106 for the purpose of exchanging messages, events and call management signals between the components of the system. As later described, one of the devices 101 may become a leading device 110 for the purpose of determining the item subject and content to be viewed by at least one of the other devices 101 which become following devices 111. Messages comprise posts of texts, images and links exchanged between devices, and also comprise control commands to synchronise simultaneous display of an item's content by the devices to permit discussion during calls as later described.

In the embodiment described, content repository 103 comprises an Apache web server. Message server 106 comprises an open source Mosquito v1 message broker using the public MQ Telemetry Transport (MQTT) publish-subscribe protocol. Alternate message protocols can be used, including the XMPP protocol. The message server may be an external cloud messaging service such as Firebase or Google Cloud Messaging. Rule repository 104 comprises a MySQL database and look up table of rules. The question and answer rules relate to the items served from content repository 103 and are served to devices 101 via message server 106. Event repository 105 comprises a MySQL database and a look up table of event data 108 inserted by devices 101 via a REST API hosted by the message server 106. As later described, event repository (105) accumulates non-speech and speech events for research analysis as taught in WO2016012751. An event is a data record that indicates and/or describes any action performed by a user of a device such as viewing or buying an item, changing the identity of the item that is the subject of the conversation. Events may also comprise non-speech or speech utterances by device users that are detected or recognised by the device, such as asking or answering a question. Events may be transmitted as messages, text files such as JSON objects, XML or binary files or data packets. In the embodiment described, events are stored in indexed SQL tables to permit flexible query access. Alternatively, they may be stored as data files.

When in a call, each device 101 detects and converts its user's audio speech signal to a digital data stream. Devices 101 may be hidden from the Internet behind routers that employ network address translation (NAT) to connect with other devices 101 where, immediately prior to call commencement, the initiating device contacts a Session Traversal of User Datagram Protocol (STUN) compliant server to establish a best configuration for peer-peer transport 109 of voice over IP (VOIP) streams between the devices. In the preferred embodiment STUN server is hosted on server 106 and complies with RFC 5389. Call establishment process follows the public Interactive Connectivity Establishment (ICE) protocol described in RFC 5245.

Figure 2:
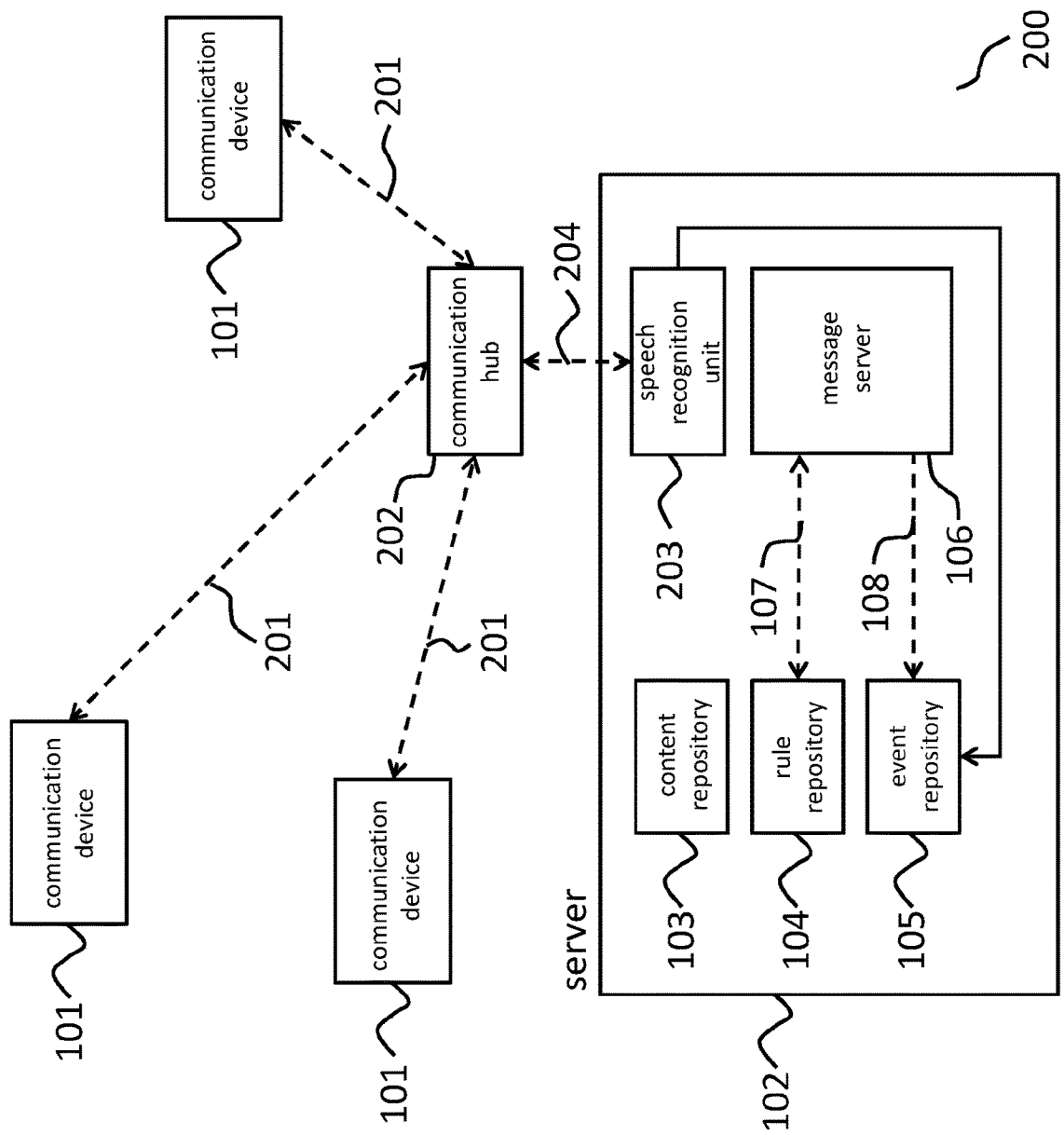
FIG. 2 is a diagram of a chat system where the speech communications between the devices are exchanged between the devices via a communication hub.

FIG. 2 shows speech processing star topology 200 whereby VOIP streams 201 between the devices are connected to speech recognition unit 203 via a communication hub 202 conditionally upon the subject item of a conversation corresponding to a research topic. In the preferred embodiment communication hub 202 is a VOIP (voice over internet protocol) server that relays audio media (i.e. telephone calls) according to the public industry standard WebRTC (Web Real-Time Communication) TURN (Traversal Using Relay NAT) communication protocols. When star topology 200 is activated the VOIP streams 201 for each calling device 101 are fed as a bundle 204 to speech recognition unit 203 to recognise events from the streams corresponding to sentiments of approval/disapproval, questions and answers.

Figure 3:
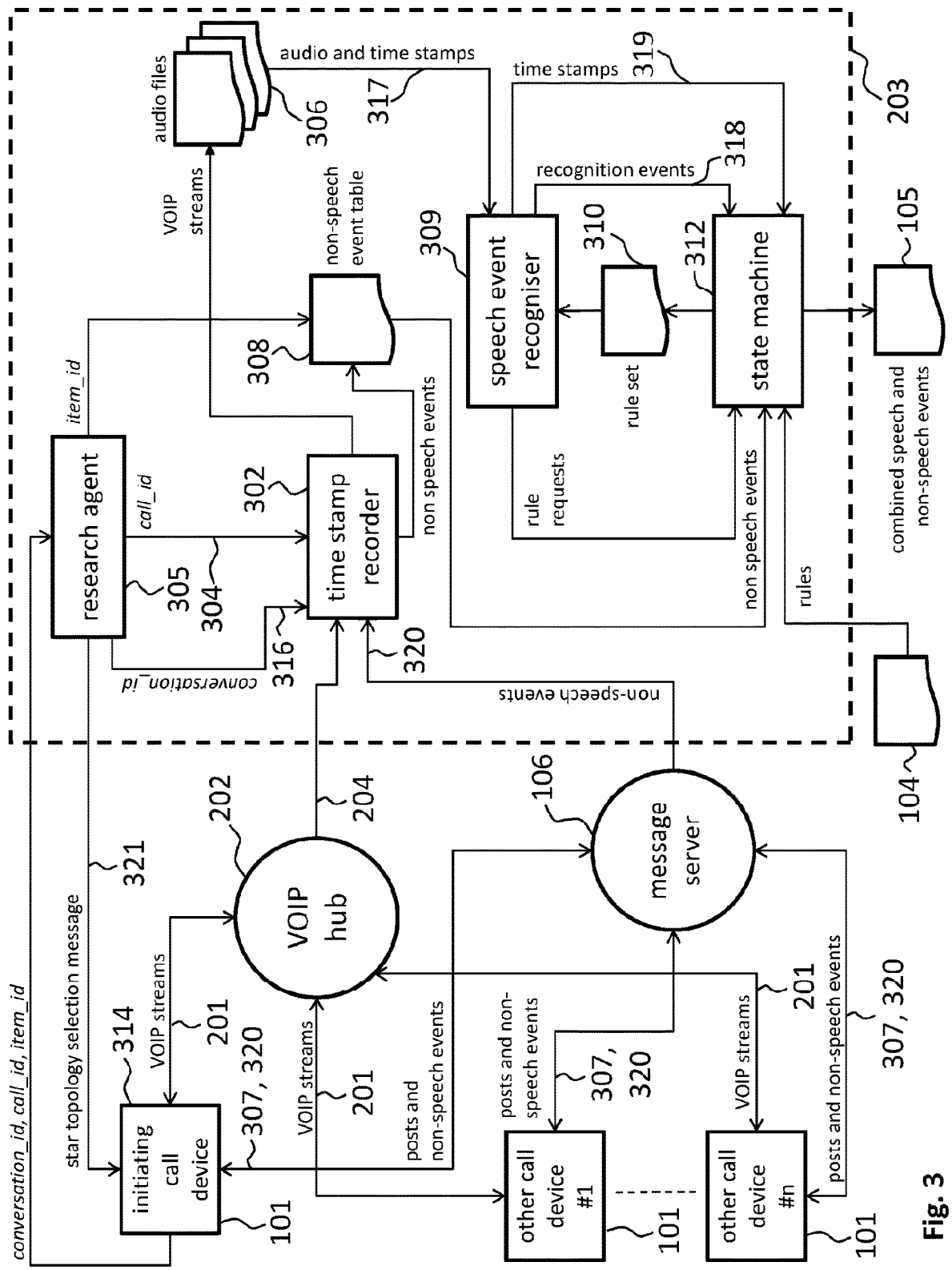
FIG. 3 is a diagram of the devices in a call where the speech communications are fed to a speech recognition unit.

FIG. 3 shows speech recognition unit 203 connected to devices 101 via hub 202. The stream bundle 204 is fed to time stamp recorder 302 which, for each stream 201 in the bundle, recovers its calling device's 101 identity dev_id, creates a temporary data file 306 and records the audio samples in the stream to the file according to a manner where the samples and their absolute times may be later determined. The embodiment names the files 306 from a composite of their respective call_id and dev_id identities and stores the samples in raw WAV 8 or 16-bit mono format with 8 kHz sample rate, where absolute time is calculated as file_creation_time+(sample_position*sample_period) where file_creation_time is the file's Coordinated Universal Time (UTC) creation date/time, sample_position is the position of the sample and sample_period is the time period between samples.

The digital time-stamped audio streams are fed to a speech event recogniser 309 which comprises a server running the speech recognition program (such as the open source CMU-Sphinx4), a vocabulary comprising English words (or tokens) and a phonetic dictionary where each word in the vocabulary maps to one or a plurality of pronunciations in the dictionary. Alternative or additional language vocabularies may be used. Other public or proprietary speech recognition programs may be used such as Kaldi, HDecode and Julius, depending on availability of language support and performance requirements.

Devices 101 are members of a conversation with a unique identity, conversation id. Each device 101 exchanges posts 307 with the other devices and logs non-speech events 320 to time stamp recorder 302 via message server 106.

Figure 4A:
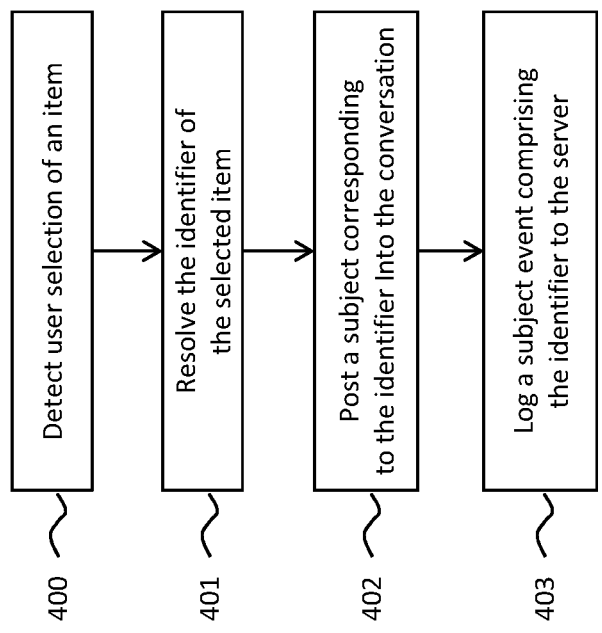
FIG. 4A is a flow diagram of the steps to select and resolve the identity of the subject item.

FIG. 4A shows the process where a device 101 identifies a subject item to the other devices 101. The device detects a user selection of an item (step 400). The device resolves the identifier corresponding to the item (step 401). In the embodiment to be described, the detection step comprises detection of haptic selection of text or graphical content presented on a touch sensitive display on the device. In alternative embodiments, selection step 400 may comprise selection of an image such as a barcode or VR Code whereby an identifier of the item is extracted and resolved from the image using a software module coupled to the device's camera and where said methods are widely known to persons skilled in the art. In other embodiments, selection step 400 may comprise selection of an image of the item and resolving the identifier from a best matching image found among images of the item stored in content repository 103 or in the Internet using a software service embedded within server 102 or elsewhere in the Internet, where said methods and services (such as Google Vision API) are widely available and known to persons skilled in the art. In other embodiments, selection step 400 comprises wireless detection of a tag (such as NFC, RFID or beacon) in close proximity to the device whereby the identifier is resolved by uploading from the tag. Device 101 posts a message denoting the change of subject to the other devices (step 402) and logs the change as an event to server 102 (step 403).

Speech recognition unit 203 comprises a research agent 205 that receives notification from initiating call device 314 that a call is about to occur and causes time-stamp recorder 302 to create and insert non-speech events from the originating call devices 101, including events denoting subject change according to steps 400 thru 403, into a temporary table non_speech_events 308. In the embodiment described, the research agent is a java program that runs locally on server that hosts speech recognition unit 203.

FIG. 4B. shows the structure of logged events. Table 308 is a MySQL table that includes columns for an index of events 404, time-stamp 405, event type descriptor 406, device identifier 407 and additional arguments according to the type of event 408. Subject events include a SKU identifier argument of the subject item; question and answer events include an identifier for the respective answer or question; and text and answer events include an argument to denote degree of approval.

To maximise recognition accuracy at any moment in the call, speech recogniser 309 is configured to recognise a set of rules 310 that is only a small subset of rule repository 104, achieved by presenting a changing set 310 whose rule composition is determined by the states that state machine transitions to on receipt of non-speech events and speech events 318 from recogniser 309, where each state corresponds to one or a plurality of rules in set 310.

Figure 5:
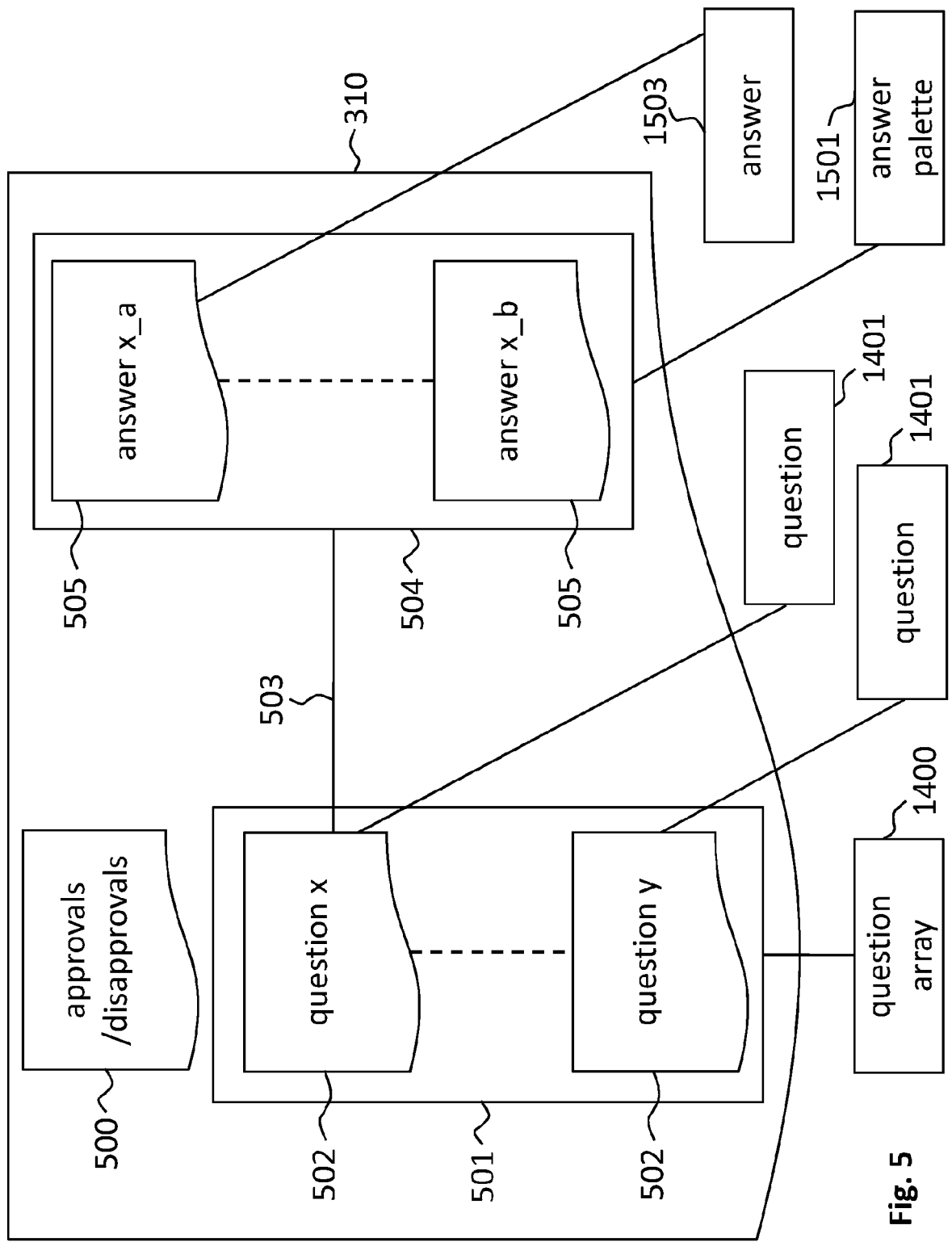
FIG. 5 is a set of exemplary rules to recognise events from the speech components.

FIG. 5 shows the composition of rule set 310. A rule is a description of a speech component for recognition purposes. The embodiment described uses the Java Speech API and Java Speech Grammar Format (JSGF) which is well known in the field of speech recognition. Alternative rule set formats may be used such as the public Speech Recognition Grammar Specification (SRGS) standard.

Rule set 310 is subdivided into arrays of rules comprising an array of approval/disapproval rules 500, an array of question rules 501 whose identify changes according to the state of state machine 312 and an array of answer rules 503 that map to each of question rules 502. Arrays 500, 501 and 503 each comprise arrays of rules where each rule corresponds to one or a plurality of spoken phrases, and where a phrase corresponds to a definition of a sequence of words or "tokens".

Approval/disapproval array 500 comprises rules that detect general expressions of approval or disapproval that do not change with the subject item. In the embodiment described, array 500 comprises an array of 21 rules to detect approval in the range −10 (extreme disapproval)<=degree<=+10 (extreme approval) where degree is a measure of the approval. Each rule is defined according to the JSGF syntax and may typically be composed of multiple sub-rules or phrases. When approval rule in array 500 is detected, speech recogniser 309 returns its tagged degree value specified between braces { }. For example, rule <approval+10> corresponds to the maximum degree of approval and might expand as sub-rules: ([I] love it|superb|excellent|awesome) {degree=10}.

Question array 501 comprises one or a plurality of rules where each rule detects a question or issue 502 users may raise that relates to the subject item. Rules 502 may each be comprised of one or a plurality of sub-rules where, for example a rule to detect a question equivalent to "Does it suit me" may be expanded as an expression of itself and other phrases with similar meaning such as Does it suit [me]|Is [it|this] appropriate|Is [it|this] OK]. On detection of a subject item non-speech event, state machine 312 drops the current question array 501 and answer arrays 504 from rule set 308 and looks up rule repository 104 to obtain the question array 501 for the next subject item in SQL syntax as: (SELECT * FROM rule_repository WHERE subject_item=next_subject_item AND event_type=question).

Question rules 502 each map 503 to an array 504 comprising a plurality of answer rules 505. When an event corresponding to a question rule 502 is recognised state machine 312 updates rule set 310 to include the mapped answer array 504.

Figure 6:
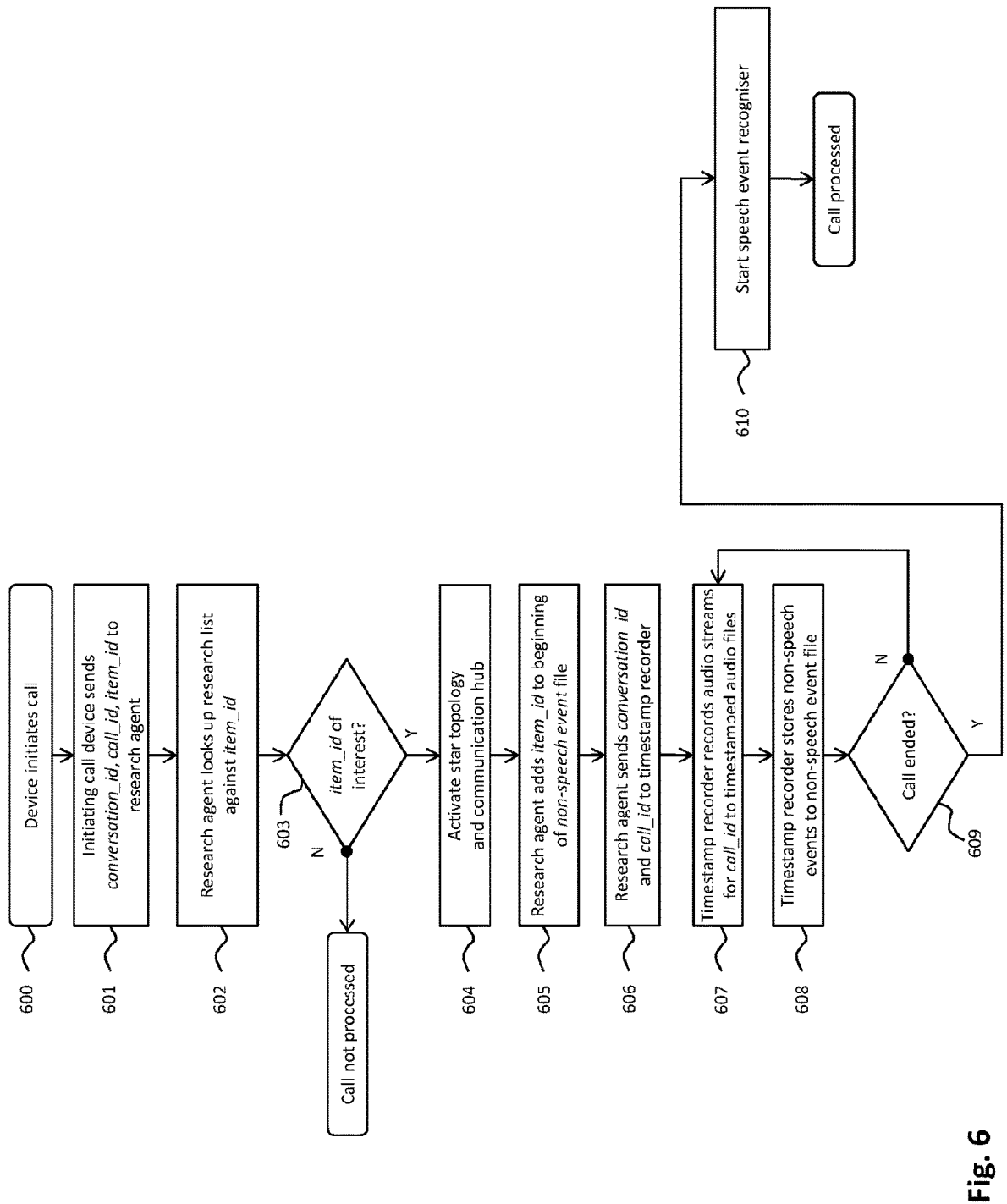
FIG. 6 is a flow diagram of a method to process a call to recognise speech events conditionally upon a subject item's identity.

FIG. 6 shows the process for recognising speech events according to the rules. To initiate a call within the conversation, one of the devices 314 invites via message server 106 the other devices 101 in the conversation to join the call (step 600). Initiating call device 314 sends the conversation's identity conversation_id, call identity, call_id, and item identity, item_id, to the research agent 305 (step 601). Only a proportion of items may be of interest for research purposes. To avoid incurring unnecessary bandwidth costs, research agent 305 relays calls via hub 202 conditionally upon their subject by querying a database to determine whether item_id, or a category corresponding to item_id, is flagged as of interest for research purposes (step 602). If item_id is of interest (step 603) the research agent messages the initiating call device 314 to activate a call with the other devices and routes the call's VOIP streams 201 via communication hub 202 in star topology 200 (step 604). Research agent 305 creates a temporary non-speech event table 308 and adds the subject event to the beginning of the table (step 605). Research agent 305 sends the calling devices' 101 conversation identity topic_id and call identity, call_id, to cause the time stamp recorder 302 to subscribe to message server 106 to receive the non-speech events 320 and insert them into table 308 as the call progresses (step 606). During the call time stamp recorder (302) records the VOIP streams 201 corresponding to call_id, each corresponding to speech audio data from one of the calling devices 101, to temporary audio files 306 (step 607) and time stamp recorder (302) stores non-speech events 320 to temporary table 308 as the call progresses (step 608). When the call ends (step 609) speech event recogniser 309 reads audio file 306 for each calling device to detect the spoken components in the time order they occurred (step 610) as further described below.

Figure 7:
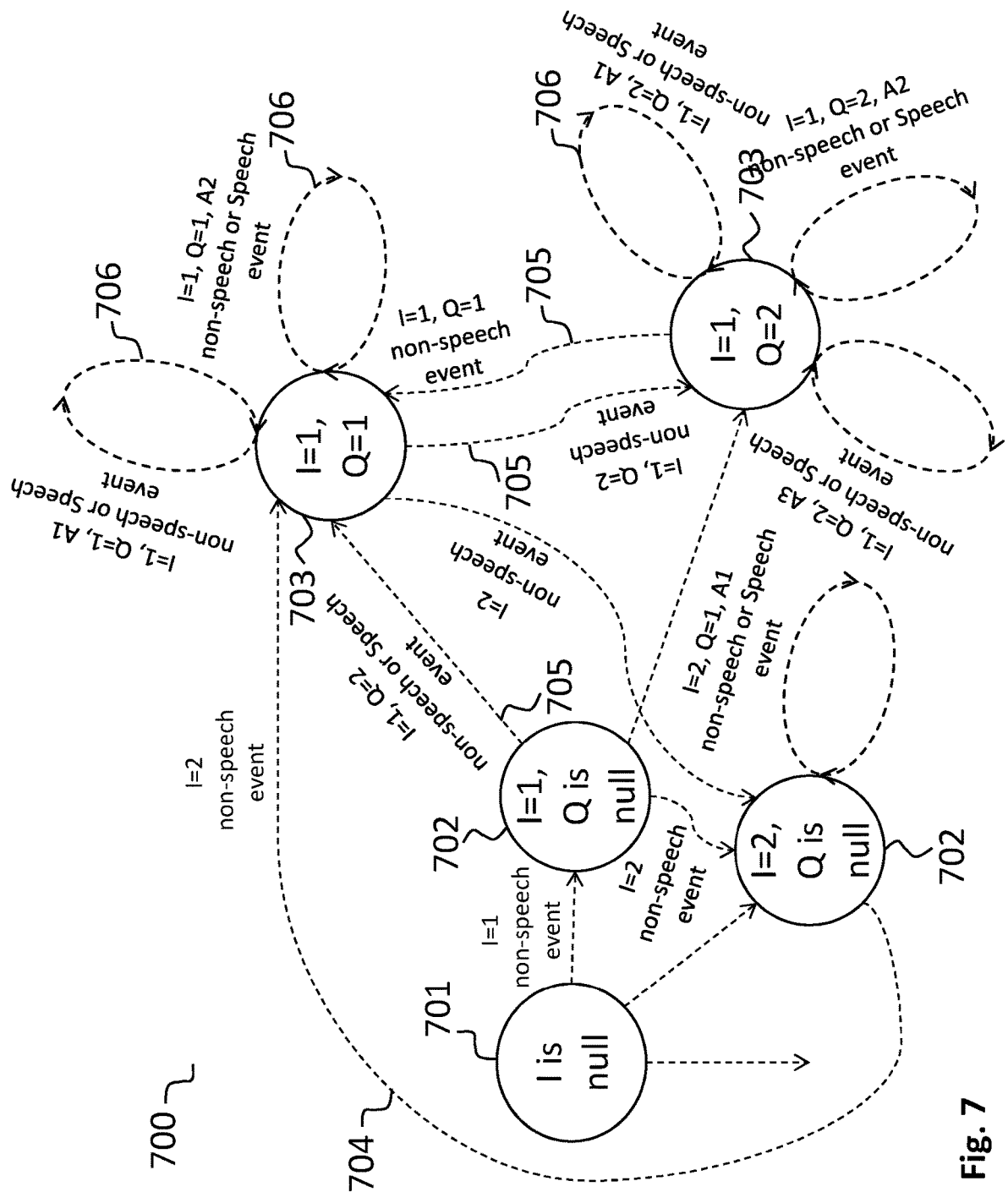
FIG. 7 is a diagram of a state chain comprising exemplary subject item and question states.

FIG. 7 shows the process whereby state machine 312 transitions between a chain comprising a plurality of states each represented by a circle 700. State machine 312 is a finite state machine whose principles and practice are well understood in computing and engineering. The state machine may transition to a different state on occurrence of events of certain types, allowing the speech event recogniser to limit detection to rules that apply only to the current state. The benefit is to reduce failures from seeking to recognise rules unnecessarily. A null item state 701 corresponds to a state where an item is not raised as the subject. Null question state 702 corresponds to a raised item, I, where no question Q is raised. Question state 703 corresponds to an asked question Q about I. One or a plurality of Q states may exist for each I. Certain types of non-speech events cause transitions 704 from I and Q states to other I states, such as posting an item (PI event, described later) into the conversation's timeline or the lead caller in a synchronised session changing the shared item for viewing (V event as described later). Question events cause transitions 705 from I and Q states to other Q states. Answer events such as exemplary "Suits you" cause no state transition 706. Transition rules for allowed state transitions are retrieved from rule repository 104. State machine saves the combined non-speech events with detected speech events together to event repository 105.

FIG. 8 shows an exemplary excerpt of rules from repository 104. The rules comprise a table of rows, each row representing a rule. Each rule is broken out by columns comprising a unique identifier 800, a name 801, the state to which the rule corresponds (represented by circles 701, 702 and 703 in FIG. 7 and column 802 in FIG. 8), the subject item identifier (e.g. SKU) to which the state corresponds 803, the type of event corresponding to the rule 804, and the state, if any, to which state machine 312 transitions if the rule is recognised (represented by lines 705 connecting the circles in FIG. 7 and column 805 in FIG. 8). Responsive to an event corresponding to a recognised rule 318 received from speech event recogniser 309 the state machine (312) queries rule repository 104 against the recognised rule and current state to determine whether to transition to a next state, described in SQL syntax as (SELECT transition FROM transition_repository WHERE state=current_state AND rule_name=recognised_rule) INTO next_state. For example, if rule "Does it suit me" is detected while the subject is "Red Shoes 123" the state machine 312 changes state from state 1001 to state 1002.

Figure 9:
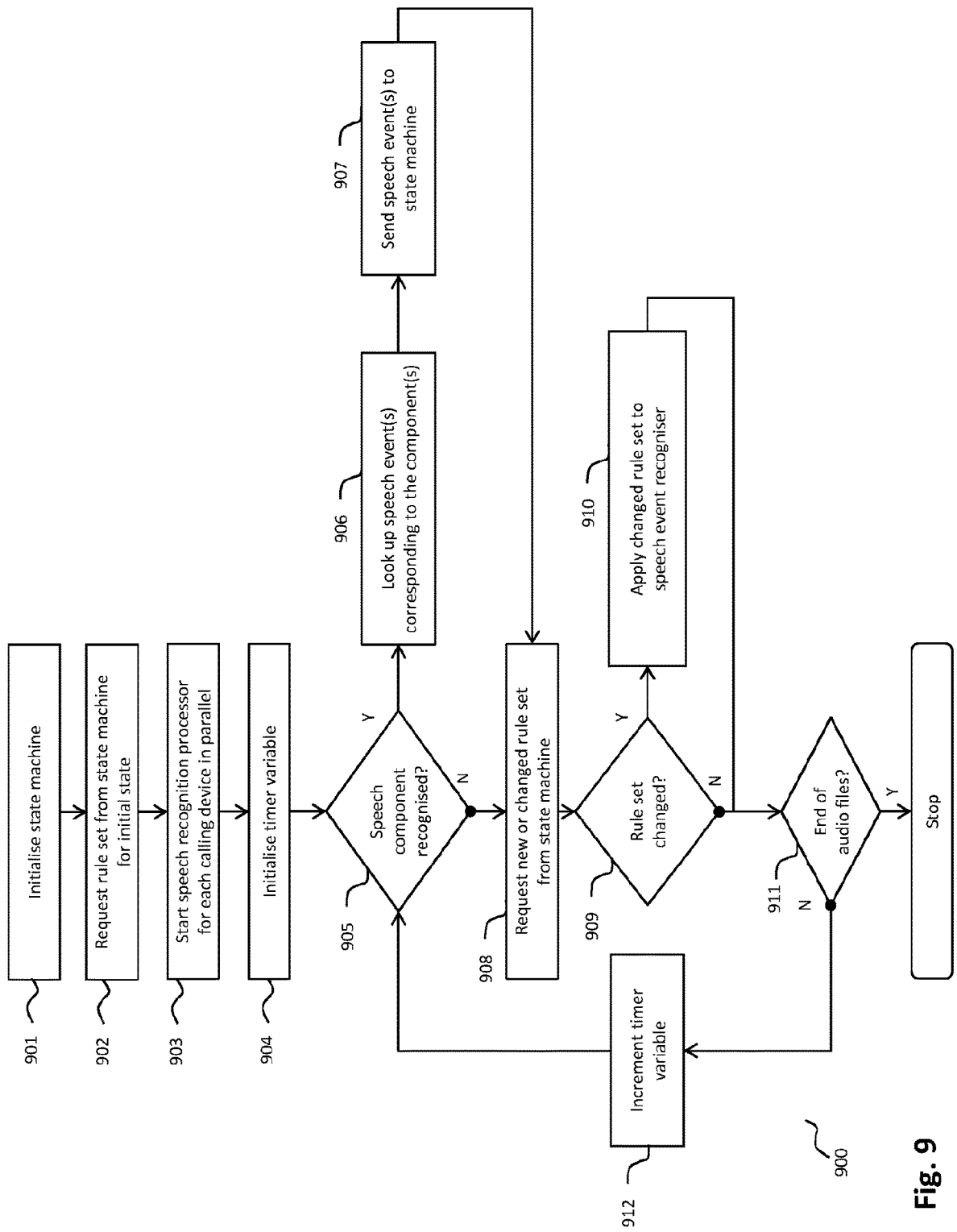
FIG. 9 is a flow diagram of a method for recognising the speech events.

FIG. 9 shows steps of the speech event recogniser process 900. The state machine 312 is initialised to the state on transition from the last non-speech event prior to call commencement (step 901) and loads the rule set 310 corresponding to the initial state (step 902), the speech event recogniser spawns multiple speech recognition processes for concurrent execution (i.e. in parallel) where each processes one of the audio files 306 corresponding to one of the calling devices 101, wherein the processors are coordinated to advance through the same time segment of the files at the same time (step 903). Speech event recogniser initialises a timer variable (step 904) and repetitively processes in a loop audio files 306 to recognise the speech component(s) that satisfy the rule(s) in set 310 at the time of the timer variable, incrementing the timer variable by a small time step each time the loop is traversed (step 912). If a component is recognised (step 905), speech event recogniser looks up the event corresponding to the recognised component (step 906) and sends the event to state machine 312 (step 907). Speech event recogniser polls state machine 312 for a next or changed rule set 310 corresponding to a next state 701, 702, 703 if a transition occurs (step 908). If the set changes (step 909), speech event recogniser 309 sends the changed set 310 to each of the speech recognition processors (step 910) and tests whether the end of the audio files is reached (step 911). If the end is not reached, speech event recogniser increments its time variable by a time step and repeats from step 905. In the embodiment described time step=0.1 s.

Figure 10:
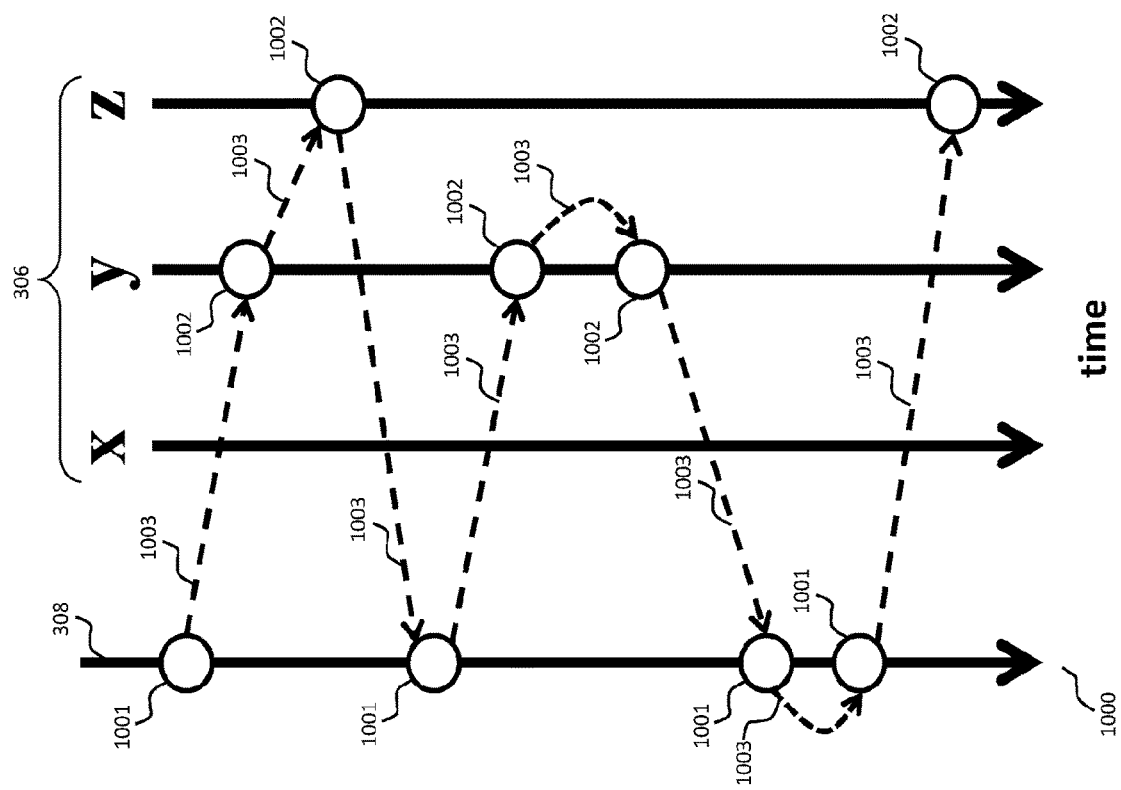
FIG. 10 is a time sequence of exemplary non-speech and speech events originating from devices in a call.

FIG. 10 shows exemplary sequences 1000 of non-speech events 1001 from non-speech event file 308 and time sequences of speech events 1002 recognised in audio files 306 for each call device 101 illustrated for exemplary devices x, y and z. The state machine 312 combines non-speech event and speech event sequences together in repository 105 for later research and analysis, where the non-speech events and speech events are combined in the time order they occur, as illustrated by dashed path 1003.

Figure 11:
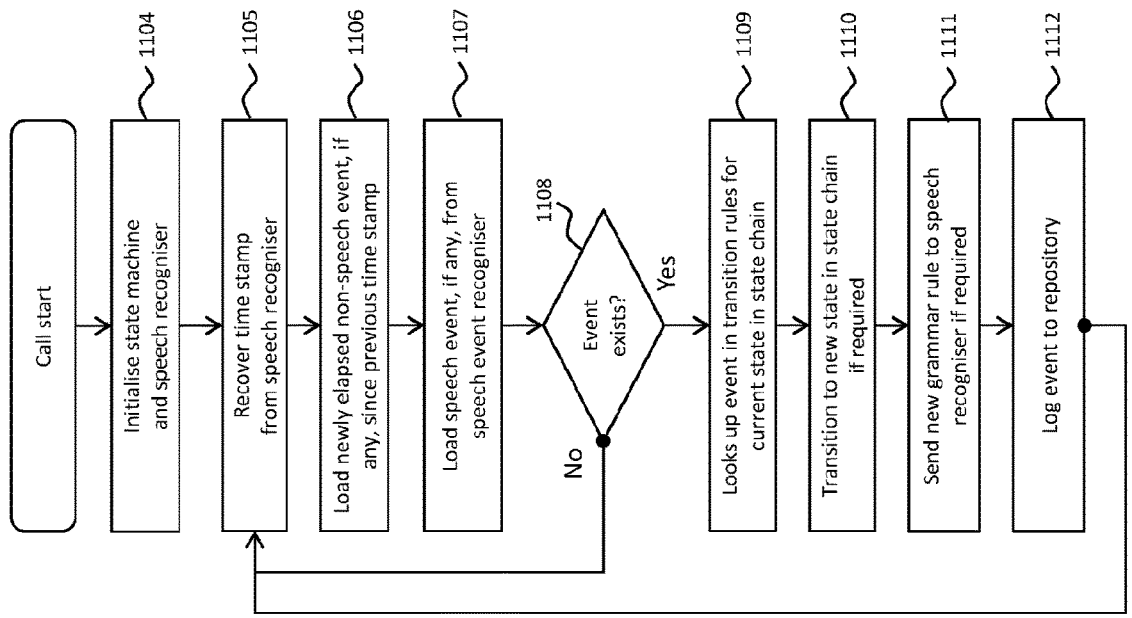
FIG. 11 is a flow diagram of a method for processing the events.

FIG. 11 shows the steps whereby the state machine 312 combines the non-speech and speech events. On start of a call, state machine 312 initially queries event repository 104 for the non-speech conversation events prior to the start of the call and transitions through the events in sequence to reach the initial state of the call, and queries event repository 104 to obtain the rules that correspond to the initial state (step 1104). The state machine 312 enters a loop until the call ends whereby it recovers the time stamp 319 from speech event recogniser 309 (step 1105). The state machine attempts to load an event from non-speech event file 308 or speech event recogniser 309 that has elapsed since the previous time stamp to the recovered time stamp, if any event exists (steps 1106 and 1107). If an event exists (step 1108), state machine 312 queries rule repository 104 for the transition state rules that correspond to the current state 802, the event's type 804 and argument 408 (step 1109) and transitions to the next state (702 or 703 in FIGS. 7 and 805 in FIG. 8) specified by the rule if the transition state is not null (step 1110), sends a modified rule set 310 to speech event recogniser 309 if the state requires (step 1111), logs the event to event repository 105 (step 1112) and repeats the aforementioned steps from step 1105.

Figure 12A:
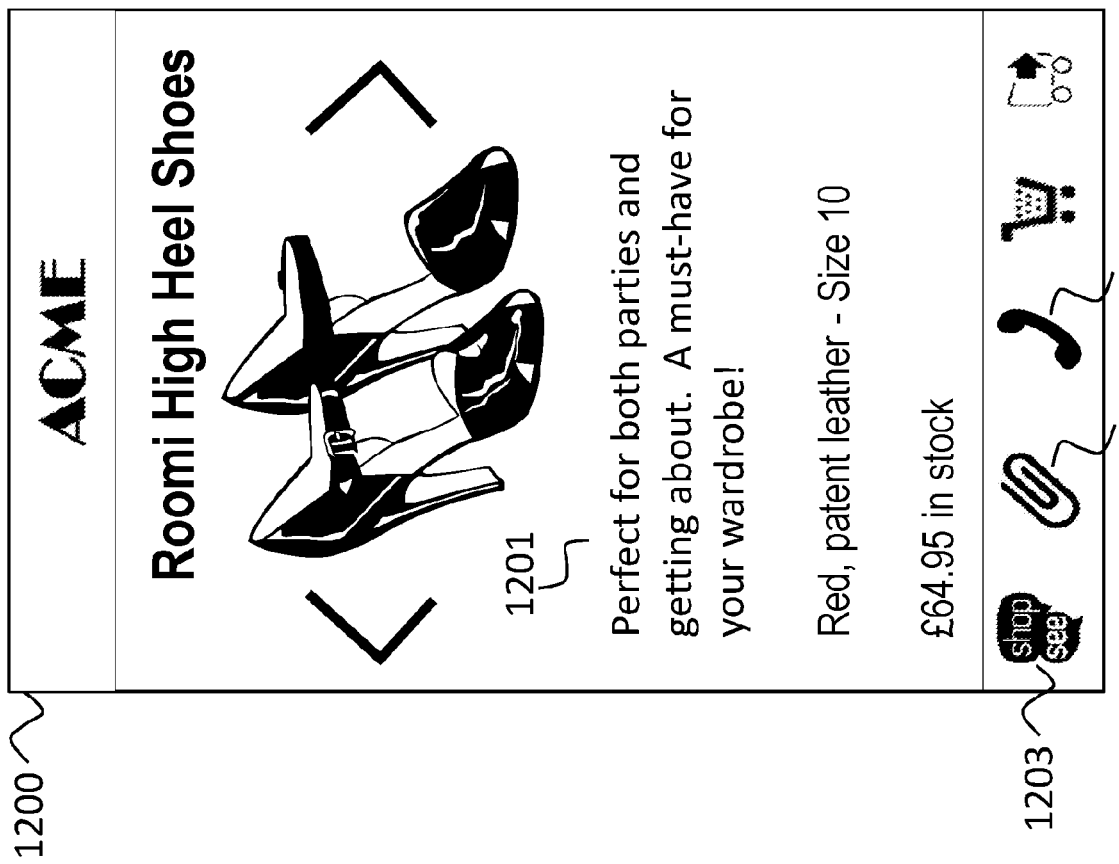
FIG. 12A is a diagram of item content displayed to the screen of a device that is not in a call.
Figure 12B:
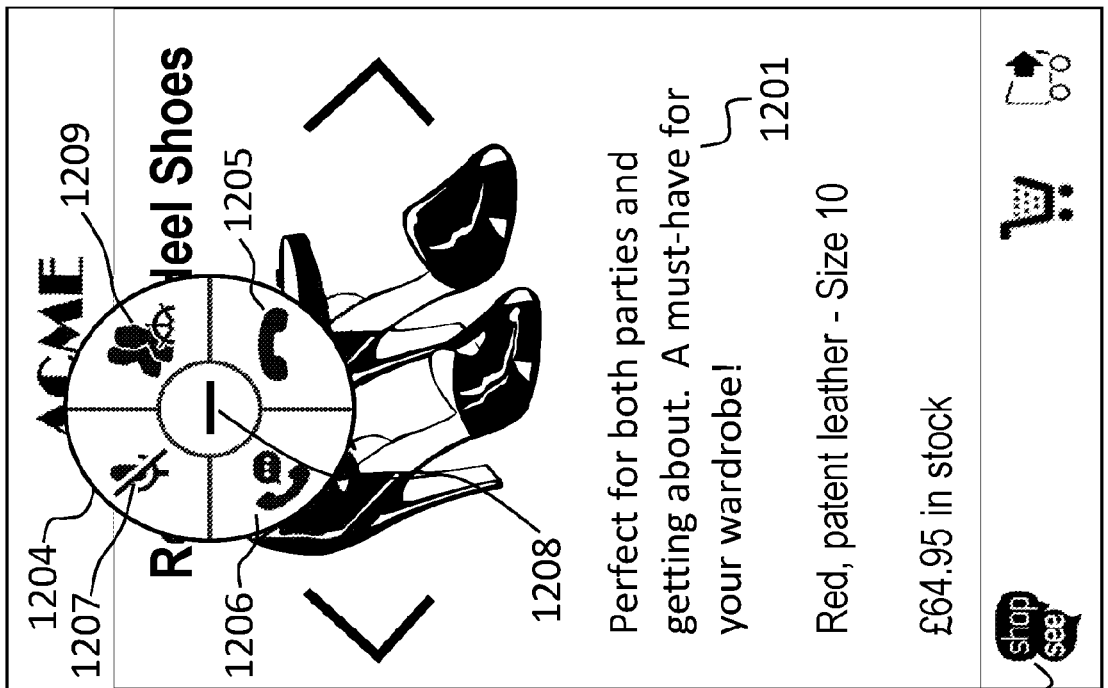
FIG. 12B is a diagram of item content displayed to the screen of a device in a call.

FIG. 12A shows a scene 1200 depicting item content such as name, description or image 1201 related to an item displayed by a software application installed to each of devices 101. User selects control 1202 to resolve and post the item as the subject of a conversation. On selection of subject control 1202 device 101 stores the item's identity as the subject identity, S, and posts S to the other devices. Devices 101 are adapted to allow their users to discuss in speech conversation simultaneously to seeing content 1200 displayed by starting a multi-way WebRTC voice call between devices of the conversation on user selection of call control 1203. FIG. 12B shows content scene 1200 when a call is in progress. When the call starts a palette 1204 is displayed over item content 1200 to allow control of the call while it is in progress. Palette 1204 comprises an on-hook control 1205 to allow a device user in conversation to leave the call, a speaker phone control 1206 and a mute microphone control 1207, a control to minimise the palette size 1208 so as to reduce occlusion of the content scene 1200 or chat scene (to be later described) beneath it, and is adapted to remain in a fixed position on the screen irrespective of which item's content 1201 is displayed and irrespective of whether a content scene or a chat scene is displayed to the screen.

Figure 13:
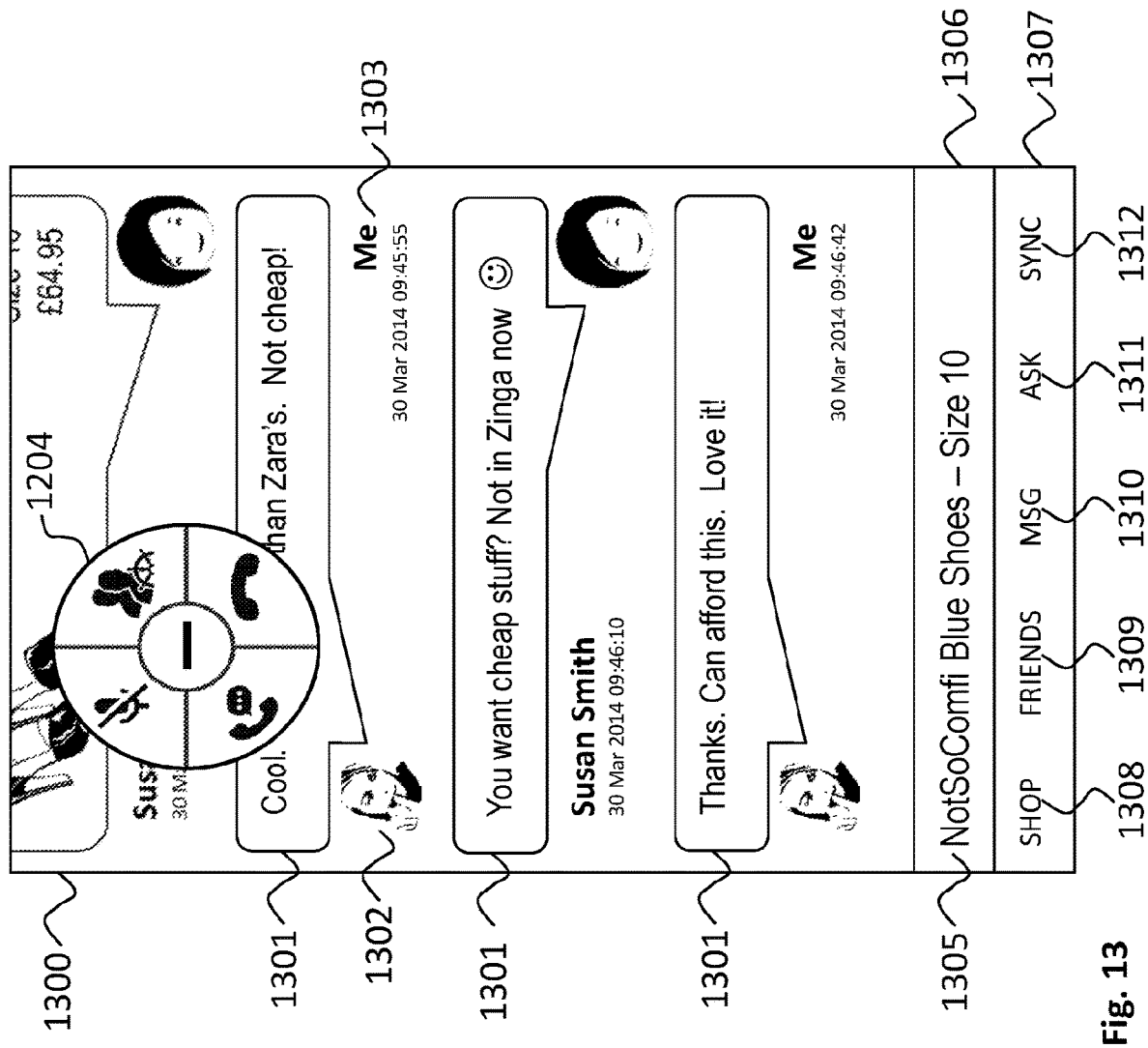
FIG. 13 is a diagram of a conversation timeline comprising posted messages exchanged between the devices.

FIG. 13 shows a chat conversation scene 1300, displayed on selection of icon 1203, comprising the non-speech components 1301 adjacent to the identities of their sending device users 1302 and 1303, and displays subject S 1305 where, on receipt of a next S from another device, display 1305 is updated accordingly. Scene 1300 comprises non-speech components 1301 received by the device from, or posted by the device to, other devices of the same conversation displayed in time order. The display contains a box comprising one or a plurality of user selectable controls. Selecting cell 1308 causes the device to display content scene 1200. Selecting cell 1309 edits the device membership of the conversation. Selecting cell 1310 causes a keyboard to be displayed to allow composition and posting of a text message into the conversation. Selecting cell 1311 causes a palette of questions to be displayed to the device. Selecting cell 1312 initiates synchronised display of item content across the devices as described later.

Figure 14:
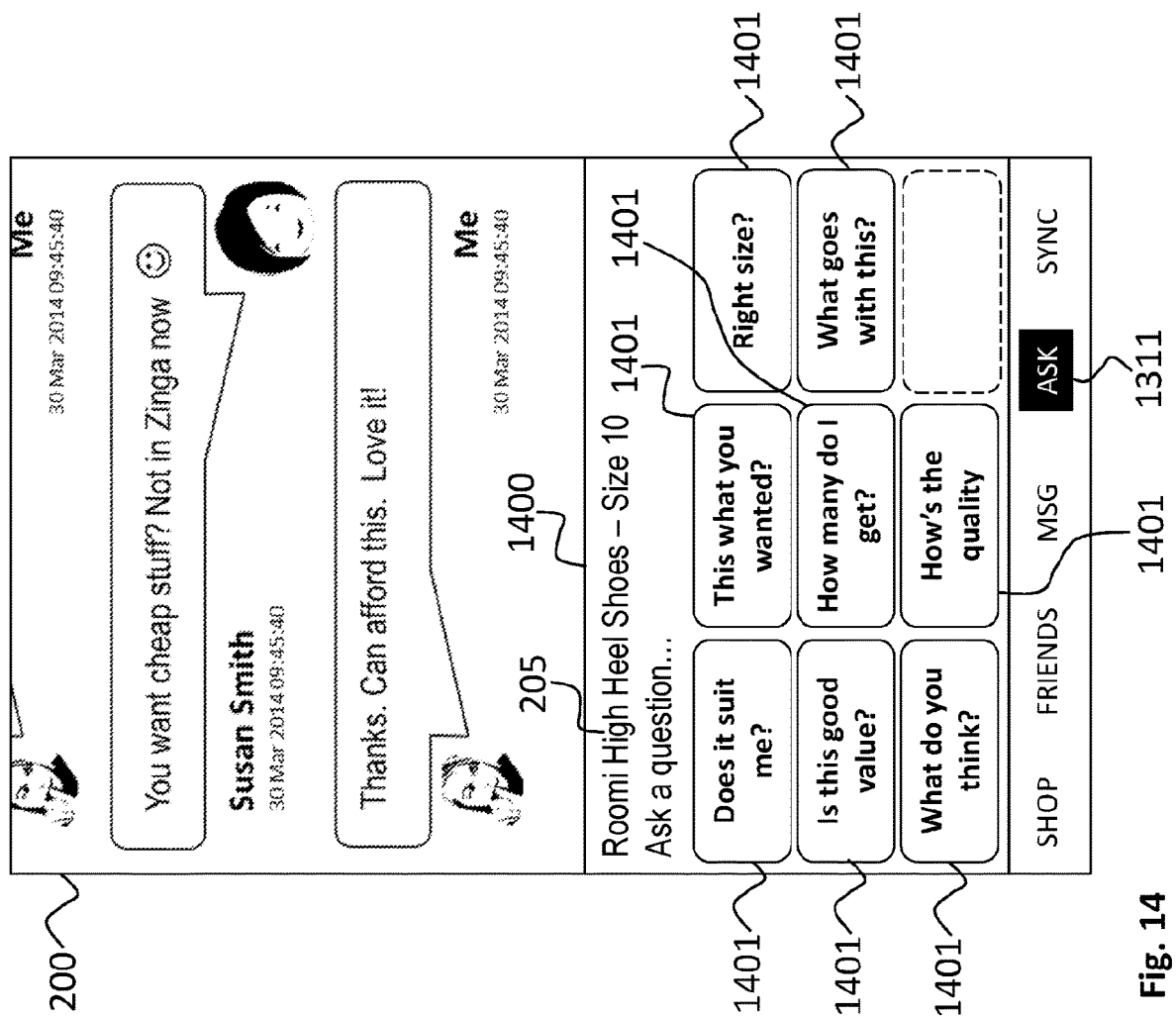
FIG. 14 is a diagram of an array of multiple question options overlaid upon a conversation displayed to the screen of an asking device.

Devices may detect approval, question and answer events during a conversation using non-speech means simultaneously to the speech processes described. FIG. 14 shows a palette 1400 comprising an array (3×3 grid) of cells 1401 each associated with a question where the array maps to an array 501 of spoken question rules and where each displayed question 1401 maps to a question rule 502 of FIG. 5 as previously described. Selection of a cell 1401 causes its corresponding question to be posted to the other devices and logged as a question event to repository 105.

Figure 15:
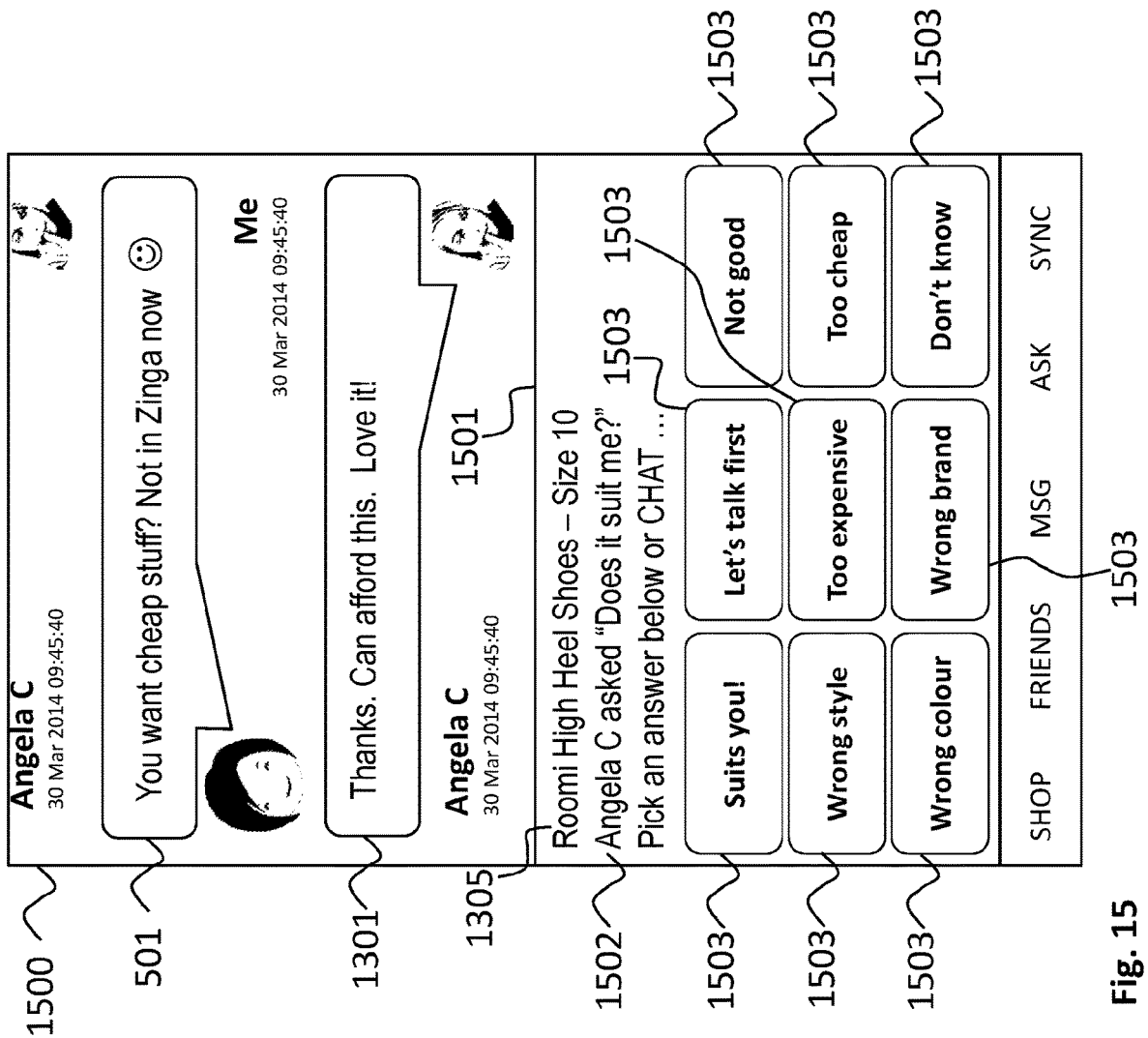
FIG. 15 is a diagram of an array of multiple answer options overlaid upon the conversation displayed to the screen of an answering device.

FIG. 15 shows the display 1500 of another device where, on receipt of the question, the another device displays a palette comprising the subject 1305, the selected question and asking device's identity 1502, and an array of multiple cells 1503 each corresponding to an answer. Array (3×3 grid) comprises cells 1401 where each cell is associated with an answer, where the array maps to an array 504 of spoken answer rules and where each displayed answer 1503 maps to an answer rule 505 of FIG. 5 as previously described. On selection of a cell 1503, the cell's corresponding answer is posted to the other devices and logged as an answer event to repository 105.

When discussing an item during a call conversation it is useful for all callers to view a same item at any given time without requiring the item to be posted by one of the callers into chat scene 1300 by having to manually select control 1202 each time a next item 1201 is viewed. Means are described for a device to detect when a next item is selected on the device, or selected on one of the at least one other devices, for viewing, to cause all devices in the call to display the next item, cause the system to treat the displayed item as the next subject item for speech recognition. The item's identity is selected by one of the devices (the "leader") where the process of synchronising display across devices is taught in WO2013175236 and further expanded herein.

Figure 16A:
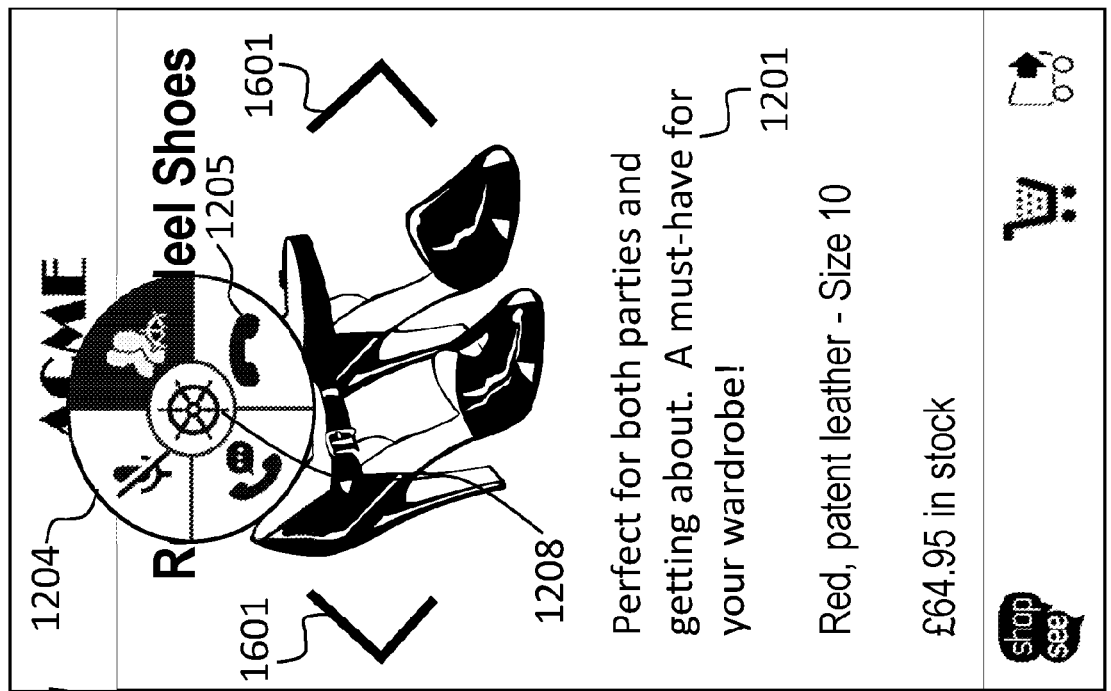
FIG. 16A is a diagram of a content scene displayed by a leading device.
Figure 16B:
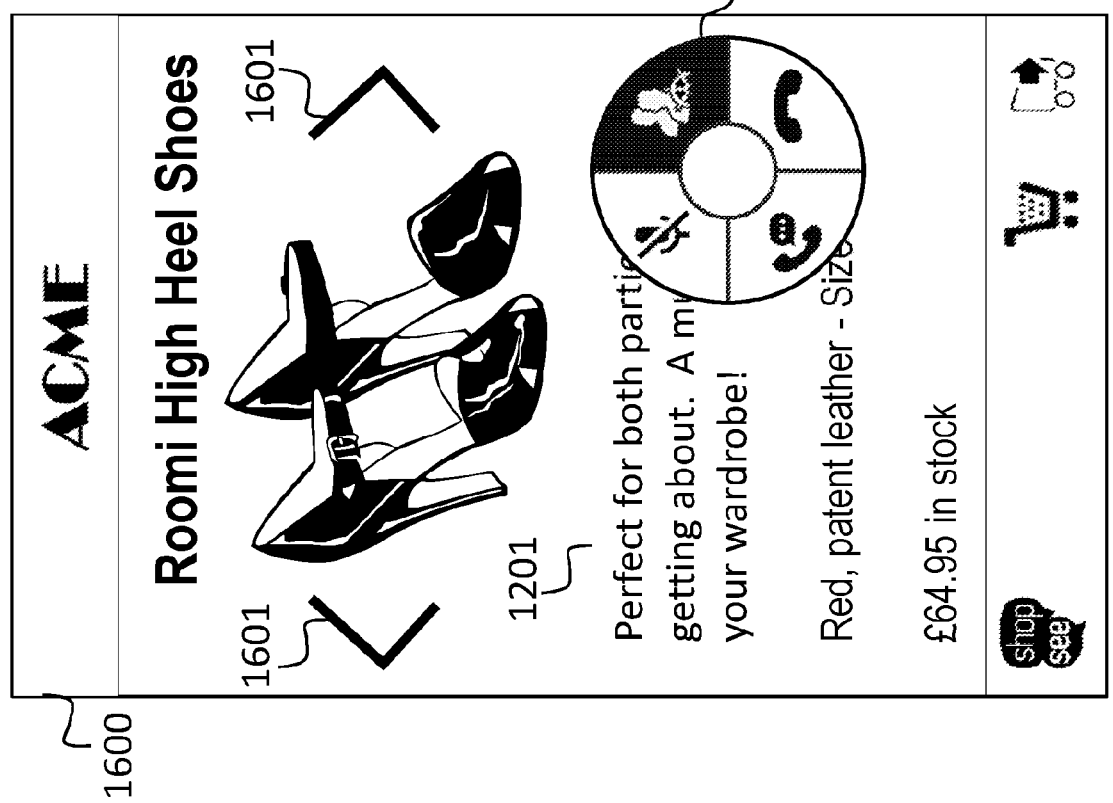
FIG. 16B is a diagram of a content scene displayed by a following device.

FIG. 16A shows exemplary scenes displayed during the call conversation by a leading device where display of the subject item content 1201 is synchronised to display a same item on at least one other device shown in FIG. 16B at the same time, and causes the other devices to become follower devices, shown in FIG. 16B. Call palettes 1204 on follower devices display a request to lead control 1208. Responsive to detection of selection of controls 1601 to change the displayed item, leader device posts a subject item event corresponding to the changed item.

Figure 17:
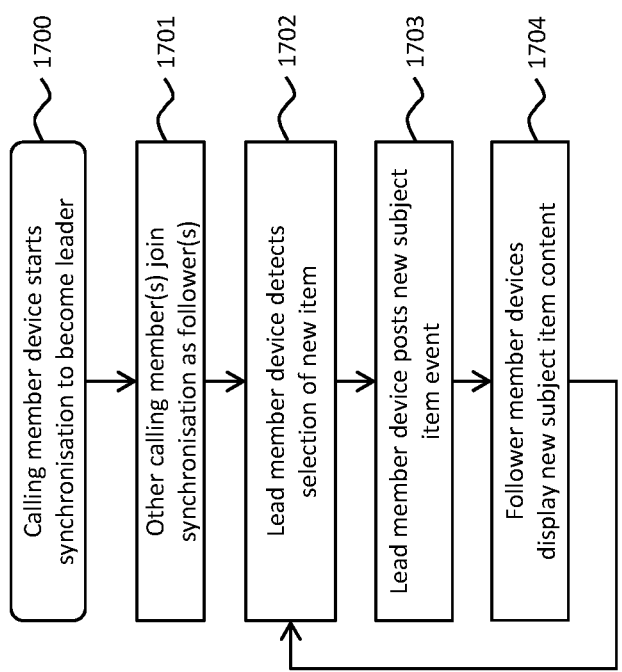
FIG. 17 is a flow diagram of the steps to synchronize real time display of item content across the leading and following devices.

FIG. 17 shows additional steps to FIG. 11 when a call is synchronised. During the call, one of the devices 101 detects selection of synchronisation start control 1312 and becomes a leading device 110 (step 1700). At least one of the other devices detects selection of a display pop-up (not shown) to accept invitation from the leading device to join the synchronised call as a follower and becomes a following device 111 (step 1701). Leading device 110 detects selection of a control 1601 or a haptic gesture (e.g. a swish) to select display of a next item 1201 (step 1702). Leading device 110 posts the identity of the next item to the follower devices 111 and posts the item as a subject event to speech recognition unit 203 (step 1703). Responsive to receipt of the post of the next subject item, the follower device(s) 111 display(s) in real time content 1201 that corresponds to the subject item (step 1704). On detection of control 1208, a following device may swap leading-following roles with the leading device or, alternative embodiments, swapping occurs on detection by the following device of a next item selection 1601 or swish gesture.

The invention can be implemented as a computer program item, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be deployed to be executed on one computer or on multiple computers at one site or distributed across multiple sites and interconnected by a communication network.

The described embodiment locates repositories 103, 104 and 105 in a single physical platform 102, and co-locates message broker and WebRTC processes on Linux server platform 106. Alternatively 102 and 106 may be subdivided, co-located and/or distributed across a plurality of communicatively coupled platforms in any combination.

Method steps of the invention can be performed by one or more programmable processors executing a computer program to perform functions of the invention by operating on input data and generating output. Method steps can also be performed by special purpose logic circuitry, e.g., an FPGA (field programmable gate array) or an ASIC (application-specific integrated circuit) or other customised circuitry. Processors suitable for the execution of a computer program include CPUs and microprocessors, and any one or more processors. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g. EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

To provide for interaction with a user, the invention can be implemented on a device having a screen, e.g., a CRT (cathode ray tube), plasma, LED (light emitting diode) or LCD (liquid crystal display) monitor, for displaying information to the user and an input device, e.g., a keyboard, touch screen, a mouse, a trackball, and the like by which the user can provide input to the computer. Other kinds of devices can be used, for example, feedback provided to the user can be any form of sensory feedback, e.g., visual feedback, auditory feedback, or tactile feedback; and input from the user can be received in any form, including acoustic, speech, or tactile input.

A skilled person will appreciate that variations of the order of the steps, processes and disclosed arrangements are possible. Accordingly the above description of the specific embodiment is made by way of example only and not for the purpose of limitation. A reference to a singular entity may mean also a reference to a plurality of the entity, and a reference to a plurality of entities may mean also a reference to a single of the entities. It will be clear to the skilled person that minor modifications may be made without significant changes to the operation described.

The invention claimed is:

1. A communication system comprising a communication device, such as a telephone device, the system being configured to:
   exchange speech and non-speech components of a conversation with at least one other communication device;
   resolve an item as the subject of the conversation using the communication device and/or the at least one other communication device;
   display the item and/or an identifier of the item;
   select a set comprising rules, such as grammar, vocabulary, language and/or phonetic rules, that corresponds to the subject;
   detect and store digital data corresponding to the speech components detected by each of the communication devices;
   detect events indicative of the non-speech components; and
   recognize an event within the digital data at least partially using or based on the set.

2. The system of claim 1, wherein the subject is resolved by selection of the item displayed by the communication device and/or the at least one other communication device.

3. The system of claim 1, wherein the subject is resolved by extracting an identifier of the item from an image such as a barcode or VR Code.

4. The system of claim 1, wherein the subject is resolved by recognizing an identifier of the item from an image of the item sensed with a camera of the communication device or the at least one other communication device.

5. The system of claim 1, wherein the subject is resolved by uploading an identifier of the item from a wireless tag such as NFC, RFID or beacon.

6. The system of any claim 1, wherein the rules of the set are changed at least partially in response to recognition of the event.

7. The system of claim 1, wherein at least one of the rules of the set relates to a question or issue about the resolved subject.

8. The system of claim 7, wherein at least one of the rules relates to an answer to the question or issue.

9. The system of claim 7, wherein at least one rule that relates to questions, issues and/or answers about the subject are dropped from the set on resolution of a next subject.

10. The system of claim 1, wherein the event is a non-speech event.

11. The system of claim 1, wherein the system streams the speech components for recognition conditionally upon the identification of the subject.

12. The system of claim 1, wherein the event corresponds to resolution of the subject.

13. The system of claim 1, wherein the event denotes approval or disapproval, or a question or an answer related to the subject.

14. The system of claim 1, wherein the communication system comprises a chat network wherein the subject is displayed within a chat conversation that is adapted to support speech conversation.

15. The system of claim 1, wherein the rules of the set correspond to question and answer components that map at least partially to questions and answers displayed in the chat conversation.

16. The system of claim 1, wherein a next speech component for recognition is determined from detection of a non-speech event.

17. The system of claim 1, wherein the speech events and non-speech events are saved to an event repository.

18. The system of claim 1, wherein:
the communication device is adapted to lead by:
    displaying a lead control while a call is in progress;
    detecting selection of the control;
    detecting resolution of a subject; and
    posting an event corresponding to the selection; and
the at least one other communication device is adapted to follow by displaying the content corresponding to the subject.

19. A server for use in the system of claim 1, the server being communicatively connected to the communication devices and configured to:
select a set of rules that corresponds to the subject;
wherein the server is configured to:
    detect and store digital data corresponding to the speech components detected by the telephone devices;
    recognize an event within the digital data at least partially using or based on the rules; and
    log events generated by the devices on occurrence of a non-speech component, and log data describing the component and/or the time of the occurrence generated by the communication device.

20. A method of using a communication system comprising a communication device, such as a telephone device, the method comprising:
exchanging speech and non-speech components of a conversation with at least one other communication device;
resolving an item as the subject of the conversation using the communication device and/or the at least one other communication device;
displaying the item and/or an identifier of the item;
selecting a set comprising rules, such as grammar, vocabulary, language and/or phonetic rules, that corresponds to the subject;
detecting and storing digital data corresponding to the speech components detected by each of the communication devices;
detecting events indicative of the non-speech components; and
recognizing an event within the digital data at least partially using or based on the set.

* * * * *